(No Model.) 2 Sheets—Sheet 1.
T. PARKER.
SLUICEWAY AND FLOOD GATE.
No. 372,040. Patented Oct. 25, 1887.
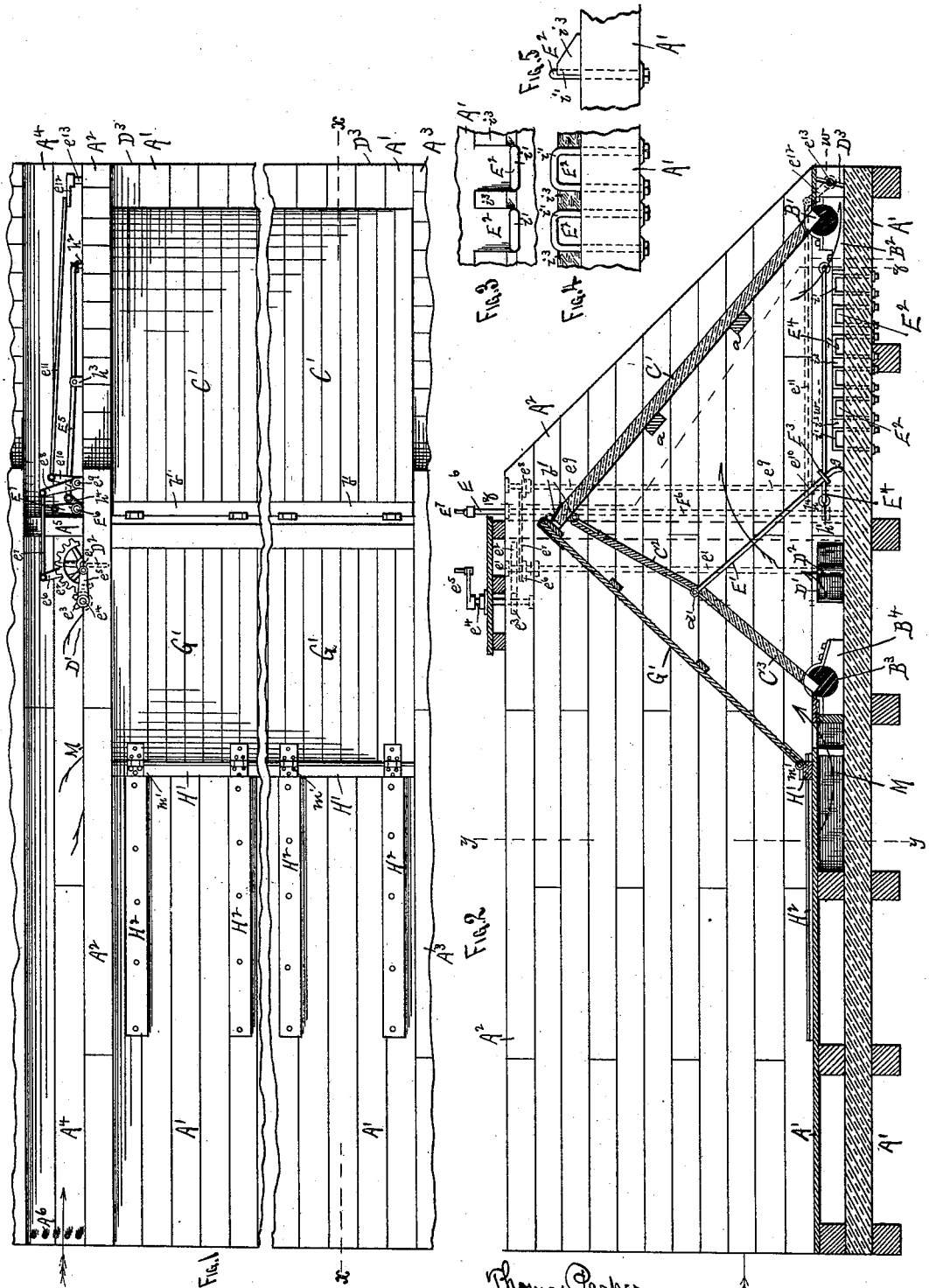
WITNESSES
Robt B Scott
H. S. Webster
Thomas Parker
INVENTOR BY
Charles N. Woodward, Atty.

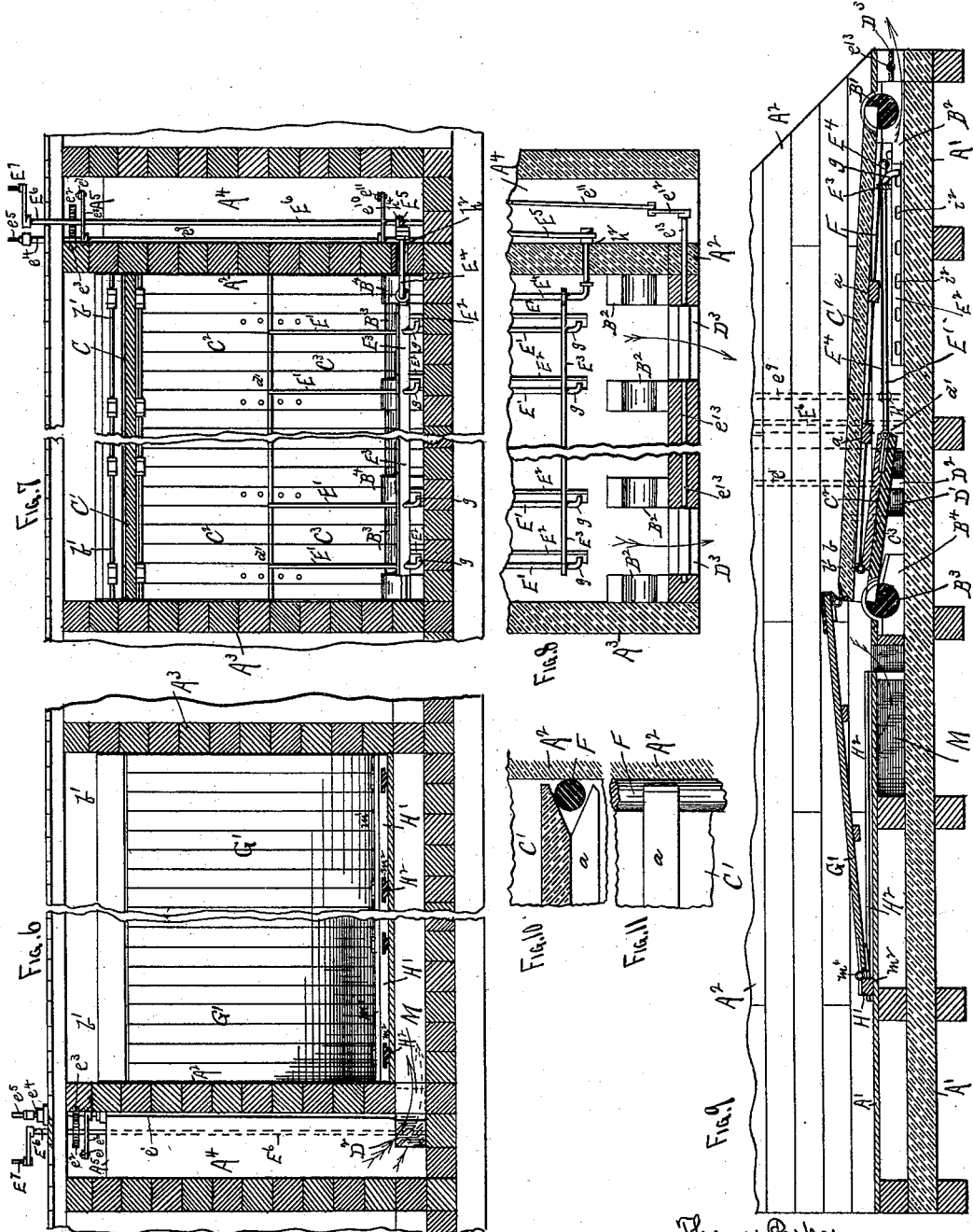

UNITED STATES PATENT OFFICE.

THOMAS PARKER, OF MENOMONEE, WISCONSIN.

SLUICEWAY AND FLOOD GATE.

SPECIFICATION forming part of Letters Patent No. 372,040, dated October 25, 1887.

Application filed May 16, 1887. Serial No. 238,408. (No model.)

*To all whom it may concern:*

Be it known that I, THOMAS PARKER, a citizen of the United States, residing at Menomonee, in the county of Dunn and State of Wisconsin, have invented certain new and useful Improvements in Sluiceway and Flood Gates, of which the following is a specification.

This invention relates to the gates used in mill and other dams for sluicing logs, &c., and for "flooding" ponds and streams; and it consists in the construction whereby the gate is made self-operating by the pressure of the water which is utilized to elevate the gate, as hereinafter shown.

The invention further consists in the manner of constructing the gate, whereby it may be held poised at any desired point of elevation, as hereinafter shown and described, and specifically pointed out in the claims.

In the drawings, Figure 1 is a plan view; and Fig. 2 is a sectional side elevation on the line X X of Fig. 1, showing the gate elevated. Figs. 3, 4, and 5 are enlarged details illustrating the construction of the "stops" for holding the rods by which the altitude of the gate is regulated. Fig. 6 is a cross sectional view on the line Y Y of Fig. 2, looking toward the downstream end of the gate. Fig. 7 is a cross sectional view on the line Z Z of Fig. 2, looking toward the upstream end of the gate. Fig. 8 is a plan view on the line W W of Fig. 2 of a portion of the forward or downstream end of the gate, illustrating the manner of arranging the discharge valves or gates and the altitude-regulating mechanism. Fig. 9 is a view similar to Fig. 2 of the bed and a portion of the cribbing, showing the position of the gate when depressed. Figs. 10 and 11 are enlarged details illustrating the manner of forming the "stop water" or packing upon the sides of the gates.

A' represents the "bed" of the sluiceway, and $A^2$ $A^3$ the cribbing forming the walls or sides.

The bed and cribbing may be of any desired or well-known form—timber-work, or stonework or of any other construction; but for the purpose of illustration I have shown it formed of timber-work in the ordinary manner.

Across the "downstream" end of the bed A' a roller or circular timber, B', is journaled in suitable bearings, $B^2$, secured to the bed A', and attached by one end to this roller is the gate proper, C', constructed of the plank or timbers bolted firmly together and further strengthened by cross-timbers $a$ upon the under side, as shown. $B^3$ is another roller some distance in the rear of the roller B', and similarly journaled to the bed A' by bearings $B^4$. The free end $b'$ of the gate C' is connected to this second roller, $B^3$, by a jointed section consisting of the two parts $C^2$ $C^3$, the part $C^2$ joined to the free end of the gate C' at $b'$, and the part $C^3$ joined to the roller $B^3$, while the two parts are jointed to each other at $d'$, as shown, so that when the gate C' is depressed, as in Fig. 9, the two parts $C^2$ $C^3$ will fold in beneath the gate, and when the gate is elevated, as in Fig. 2, the two sections will form a back or rear wall to the space beneath the gate. A flume, $A^4$, is formed in the space between the main walls, into which the water will freely flow from the upstream end of the dam, the flume being provided with a stop-wall, $A^5$, by which the water is prevented from flowing entirely through the flume.

The flume $A^4$ is connected to the space beneath the gate by a feed-port, D', supplied with a valve or gate, $D^2$, by which the flow of the water therethrough may be shut off if required, this feed-port being placed so that it opens into the sluiceway beneath the gate C' and the folding sections $C^2$ $C^3$, as shown, and is not uncovered by the change of position of the gate when being elevated or depressed. The water is free to flow beneath the roller B', and at one or more points in the bed A' in front of the roller B' are placed one or more discharge valves or gates, $D^3$, by which the outflow may be shut off if required.

The feed-gate $D^2$ is adapted to be opened and closed from the top of the cribbing by a rod, $e'$, passing upward to a point at or near the top of the cribbing and provided with a segment of a gear, $e^2$, adapted to engage with a pinion, $e^3$, on an upright shaft, $e^4$, journaled on the cribbing, the connection of the pinion and the segment enabling the gate to be operated with less power than if the operating-lever $e^5$ were attached directly to the rod $e'$.

Connected to the rod $e'$ near its upper end is a crank-arm, $e^6$, connected by a rod, $e^7$, to another crank-arm, $e^8$, on another upright shaft, $e^9$, journaled in the flume $A^4$ below the stop-wall $A^5$, and provided on its lower end with another crank-arm, $e^{10}$, the latter in turn connected by a rod, $e^{11}$, to a crank-arm, $e^{12}$, on the shaft $e^{13}$ of the discharge-valve $D^3$.

The rods and crank-arms will be so connected that when the lever $e^5$ is turned to close the feed-gate $D^2$ the discharge gate $D^3$ will be at the same time opened, and vice versa, so that the two gates act alternately, as hereinafter described.

In Fig. 9 the gate $C'$ is shown depressed, with the feed-gate $D^2$ closed and the discharge-gate $D^3$ open, so that the water is free to flow out from beneath the gate, but cannot enter beneath it from the flume $A^4$; hence the pressure of the water above the gate will be sufficient to keep it down upon the bed $A'$.

When it is desired to elevate the gate, the position of the valves are reversed by simply turning the lever $e^5$, which will open the feed-valve $D^2$ and close the discharge-valve $D^3$, permitting the water to flow beneath the gate, but not permitting it to escape therefrom.

The difference in altitude between the water at the upstream end and at the point where it passes beneath the gate creates a pressure sufficient to overcome the pressure of the water on the outside of the gate, and thus forces the gate upward and holds it elevated so long as the valve $D^3$ is kept closed and the valve $D^2$ kept open; or, in other words, the water in falling through the flume $A^4$ into the space beneath the gate exerts a greater pressure beneath the gate than the pressure of the water in the sluiceway outside the gate; hence the gate will be elevated and kept elevated, as before described.

The jointed sections $C^2$ $C^3$ form an essential part of the gate proper, being the only means with which I am acquainted by which the main section $C'$ can be depressed from a perpendicular or from an angle above about thirty degrees from the horizontal, which is effected, as before stated, by drawing the water from beneath the gate through port $D^3$ when the port $D'$ is closed, and thereby decreasing the pressure beneath the gate and allowing the pressure of the water entering through the port M to act upon the jointed sections and fold them down into the position shown in Fig. 9.

When the gate is to be lowered again, the positions of the valves $D^2$ $D^3$ are again reversed, the discharge-valve $D^3$ being opened to permit the water beneath the gate to flow out and downstream and the feed-valve $D^2$ being closed to prevent any more water flowing in beneath the gate, the outflowing of the water removing the pressure of the water from beneath the gate and causing the pressure of the water through the port M to act upon the double sections $C^2$ $C^3$ and forcing the gate into the position shown in Fig. 9 as fast as the water escapes by the port $D^3$.

The bed $A'$ of the sluiceway is formed with a depression where the gate $C'$ $C^2$ $C^3$ is placed, so that when the gate is lowered, as in Fig. 9, it covers this depression and forms a part of the bed of the sluiceway. By this means the presence of the gate does not affect the sluiceway or lessen its size.

$E'$ $E'$ are a series of rods jointed to the parts $C^2$ $C^3$ at their points of union at $d'$, and attached to the bed $A'$ at suitable intervals are a series of catches or stops, $E^2$, corresponding in number to the rods $E'$, and behind which the hooked ends $g$ of the rods $E'$ are adapted to be inserted to regulate the altitude of the gate when it is desired to hold it at any point other than entirely elevated or entirely depressed. The rods $E'$ are connected by a lateral bar, $E^3$, by which they are held in corresponding relations, and one end of this bar is shown embracing a rod, $E^4$, connected at one end, $h'$, to the side wall of the flume and passing out through the wall at $h^2$ at the other end, and adapted to be thrown inward and outward to move the bar $E^3$ back and forth across the stops $E^2$ to cause the hooks $g$ to be connected to or disconnected from the stops. The end of the rod $E^4$ outside the wall of the flume $A^4$ is connected to one end of a rod or arm, $E^5$, pivoted at its center to a bracket, $h^3$, on the wall of the flume, and connected at its other end to a crank-arm, $h^4$, on an upright shaft, $E^6$, running upward to a point above the cribbing, and provided with a lever, $E^7$, by which the shaft may be revolved, the revolution of the shaft causing the arm $E^5$ to be vibrated upon its pivot $h^3$ to move the rod $E^4$ inward and outward, and thereby correspondingly moving the bar $E^3$, with the rods $E'$ attached, across the stops $E^2$. When the bar $E^3$ is moved over to the point shown in Figs. 7 and 8, the hooks $g$ on the rods $E'$ are out of contact with the stops $E^2$ and the gate $C'$ is free to rise and fall to its full limit, the bar $E^3$ simply sliding along over the stops $E^2$; but if it is desired to hold the gate at an altitude less than its full height the bar $E^3$ will be moved over, so as to cause the hooks $g$ to enter behind one of the stops, which will hold the gate from being raised any higher, the height being regulated by the stop behind which the hooks are caused to enter.

I have shown two methods of forming the stops, one being illustrated in Figs. 3, 4, and 5, and consisting of iron staples $i'$, bolted through the bed $A'$ and set at the proper distance apart, the hooks $g$ adapted to catch in the staples by the moving of the bar $E^3$ from side to side. When the bar $E^3$ is held by the arm $E^4$, so that the hooks $g$ are out of contact with the staples, the rods $E'$ simply move along the bed $A'$ and are inoperative, being operative only when the gate $C'$ is to be held at any point less than its highest altitude.

In Figs. 6, 7, 8, and 9 the stops are merely slots $i^2$ in sections of L-iron, the slots being at suitable distances apart to hold the gate at the several altitudes required.

Wooden or other chocks $i^3$ will be secured between the staples $i'$ to prevent the hooks $g$ running in between them.

I do not wish to be limited to any particular form for the stops, as I am aware that they may be constructed in many different forms. Neither do I wish to be limited to the precise form of the mechanism shown for operating the rods E' or the mechanism shown for operating the valves D² D³, as I am aware that many other simple devices may be employed for the same purpose.

The flume A⁴ may be constructed of a separate conduit or tube, or in any other desired manner; but generally it will form part of the main sluiceway, as in the drawings. The entrance to the flume will be guarded by a rack, A⁶, to prevent the entrance of drift material or other foreign matter that would clog the gate or valves.

In Figs. 10 and 11 I have shown the method of forming the stop-water or "packing" by which the water is prevented from flowing past the gate C' when it is elevated, consisting simply of a roller, F, supported in any suitable manner beneath the edge of the gate C' and adapted to be forced against the walls A² A³ by the pressure of the water, to close the slight necessary gap between the gate and walls, and thus effectually "pack" the joint between them.

G' represents an "idler-section" jointed by one end to the free end b' of the gate C' and jointed by its lower end at m' to a cross-bar, H', the latter adapted to slide along ways H² on the bed A' of the sluiceway. This idler-section is intended to move with the gate C' C² C³ as it rises and falls, to cover the folding sections and prevent drift-wood or other obstructions from getting between the folding sections when the gate is depressed, and also to assist logs in passing over the gate. The edges of the ways H² are formed "dovetailed" or undercut, and the lower part of the cross-bar H' is provided with correspondingly dovetailed or "undercut" clamps m², (see Fig. 6,) adapted to enclasp the ways and hold the cross-bar down upon the bed of the sluiceway and prevent it from being raised by its own buoyancy.

M is a port or opening connecting the space beneath the idler-section G' with the flume A⁴, so that the water is free to flow beneath the idler-section and preserve the equilibrium and prevent any variation in the pressure on the two sides of the section. The port M has no valve, but is left open at all times, so that the water is free to flow in and out according as the gate and its attachments are raised or lowered.

This makes a very simple and efficient sluiceway and floodgate, and does not require any mechanism for elevating or depressing it, but is entirely automatic in its action. It is entirely submerged when depressed, and is exposed only when the water is lower than its upper end, b, which very rarely occurs. The gate is thus protected by the water and is not exposed to the changes from wet to dry, or with a portion above the water and a portion below the water, which always has a bad effect upon the durability of gates.

The gate may be made of any width or height to adapt it to any size dam or to wide or narrow streams.

The cribbing may be supplied with one or more of the flumes A⁴, if required; but generally only one will be required, as shown, and one or more of the feed or discharge valves may be employed, as required.

In Fig. 8 I have shown two of the discharge-valves; but as many may be used as required.

I have shown the gates and bed broken apart to illustrate the fact that they may be made of any required width, and to enable the drawings to be made upon a larger scale.

Having thus described my invention, what I claim as new is—

1. A sluiceway-gate consisting of main section C', jointed to the bed of the sluiceway at its downstream end and connected to the bed of the sluiceway at its upstream end by jointed sections C² C³, adapted to fold beneath said main section when said main section is lowered, and one or more feed-valves connecting the space beneath said sections with the source of supply for said sluiceway, and one or more discharge-valves adapted to discharge the water from beneath said sections, whereby said sections may be automatically elevated and depressed, substantially as and for the purpose set forth.

2. In a sluiceway-gate, the combination of the main section C', jointed to the bed of the sluiceway at its downstream end, folding sections C² C³, jointed to said main section at its upstream end and to said bed, and adapted to fold beneath said main section when said main section is depressed, feed-port D', connecting the space beneath said sections with the source of water-supply and provided with valve D², and discharge-port having valve D³, whereby water may be admitted beneath said sections to elevate said gate and discharged therefrom to lower said gate, substantially as and for the purpose set forth.

3. In a sluiceway-gate, the combination of the main section C', jointed to the bed of the sluiceway at its downstream end, folding sections C² C³, jointed to said main section at its upstream end and to said bed, and adapted to fold beneath said main section when said main section is depressed, feed-port D', connecting the space beneath said sections with the source of water-supply and provided with valve D², and discharge-port having valve D³, whereby water may be admitted beneath said sections to elevate said gate and discharged therefrom to lower said gate, said valves connected by the same operating mechanism, whereby they are opened and closed alternately, substantially as and for the purpose set forth.

4. In a sluiceway-gate, the combination of the main section C', jointed to the bed of the sluiceway at its downstream end, folding sections $C^2$ $C^3$, connecting the upstream end of said main section with the bed of the sluiceway, flume $A^4$, adapted to supply water to the space beneath said sections from the source of supply, a feed-port, $D'$, having valve $D^2$, and discharge-port having valve $D^3$, whereby said gate may be elevated and depressed automatically, substantially as and for the purpose set forth.

5. In a sluiceway-gate, the main section $C'$, jointed by its downstream end to roller $B'$, journaled to the bed of the sluiceway, jointed sections $C^2$ $C^3$, jointed at their upstream end to roller $B^3$, likewise journaled to the bed of the sluiceway, said sections $C^2$ $C^3$ jointed to each other and to the upstream end of said main section, whereby they are capable of folding beneath said main section when said gate is lowered, substantially as and for the purpose set forth.

6. In a sluiceway-gate, the main section $C'$, jointed at its downstream end to the bed of the sluiceway, folding sections $C^2$ $C^3$, connecting the upstream end of said main section with said bed and adapted to fold beneath said main section when said gate is lowered, stop-rods $E'$, connected to said folding sections and adapted to be connected by their lower ends to stops on the bed of the sluiceway, whereby the altitude of said gate may be regulated, substantially as and for the purpose set forth.

7. The combination, in a sluiceway-gate, of the main section $C'$, jointed to the bed of the sluiceway at its downstream end, folding sections $C^2$ $C^3$, jointed to said main section and to said bed, stop-rods $E'$, jointed to said jointed sections and having hooked lower ends, $g$, stops $E^2$, attached to said bed, means for moving said rods from side to side to cause said hooked ends to engage with or be disengaged from said stops, whereby the altitude of said gate may be regulated, substantially as and for the purpose set forth.

8. A sluiceway-gate consisting of a main section, $C'$, jointed to the bed of the sluiceway at its downstream end and connected to the bed of the sluiceway at its upstream end by jointed sections $C^2$ $C^3$, adapted to fold beneath said main section when said main section is lowered, and one or more feed-valves connecting the space beneath said sections with the source of supply for said sluiceway, and one or more discharge-valves adapted to discharge the water from beneath said sections and idler-section $G'$, jointed to the upstream end of said main section and adapted to run upon the bed of said sluiceway and rise and fall with said gate to protect said folding section and assist logs and other material to pass over said gate, substantially as and for the purpose set forth.

9. The combination, in a sluiceway-gate, of the main section $C'$, jointed sections $C^2$ $C^3$, idler-section $G'$, flume $A^4$, and open port M, whereby the equilibrium is preserved upon both sides of said idler-section, substantially as and for the purpose set forth.

10. The combination, in a sluiceway-gate, of the main section $C'$, jointed sections $C^2$ $C^3$, idler-section $G'$, said idler-section connected at its upstream end to cross-bar $H'$, the latter adapted to move with said idler-section upon ways $H^2$, and caused to move parallel with the bed $A'$ by being connected to said ways by dovetailed clamps, substantially as and for the purpose set forth.

11. A sluiceway-gate consisting of the main section $C'$, jointed at its downstream end to the bed of the sluiceway, folding sections $C^2$ $C^3$, connecting the upstream end of said main section with said bed and adapted to fold beneath said main section, in combination with packing consisting of roller F, adapted to be supported upon the edges of said main section and capable of being pressed against the walls of said sluiceway by the pressure of the water to prevent the passage of the water between the side walls and gate, substantially as and for the purpose set forth.

In testimony whereof I have hereunto set my hand in the presence of two subscribing witnesses.

THOMAS PARKER.

Witnesses:
C. N. WOODWARD,
H. S. WEBSTER.